US006898314B2

United States Patent
Kung et al.

(10) Patent No.: US 6,898,314 B2
(45) Date of Patent: May 24, 2005

(54) GRAYSCALE IMAGE CONNECTED COMPONENTS SEGMENTATION

(75) Inventors: Nina Kung, Owego, NY (US); Lawrence E. Albertelli, Owego, NY (US); David L. Ii, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 488 days.

(21) Appl. No.: 10/025,789

(22) Filed: Dec. 26, 2001

(65) Prior Publication Data

US 2003/0118236 A1 Jun. 26, 2003

(51) Int. Cl.$^7$ .................................................. G06K 9/34
(52) U.S. Cl. ..................... 382/180; 382/168; 382/170; 382/171
(58) Field of Search ............................... 382/168–174, 382/164.1, 80, 173, 237, 257, 103, 296, 190, 164; 348/416.1, 254–256, 671–672; 358/453, 1.9, 3.01; 345/589–590

(56) References Cited

U.S. PATENT DOCUMENTS

| | | | |
|---|---|---|---|
| 4,958,064 A | 9/1990 | Kirkpatrick | |
| 5,481,622 A | * 1/1996 | Gerhardt et al. | 382/103 |
| 5,579,407 A | 11/1996 | Murez | |
| 5,594,807 A | * 1/1997 | Liu | 382/128 |
| 5,809,167 A | 9/1998 | Al-Hssein | |
| 5,818,978 A | 10/1998 | Al-Hssein | |
| 5,909,251 A | 6/1999 | Guichard et al. | |
| 6,141,433 A | 10/2000 | Moed et al. | |
| 6,141,460 A | 10/2000 | Amer et al. | |

* cited by examiner

*Primary Examiner*—Bhavesh M. Mehta
*Assistant Examiner*—Ali Bayat
(74) *Attorney, Agent, or Firm*—McGuireWoods LLP

(57) ABSTRACT

A method and system of reading images. The method includes decimating an image and normalizing the decimated image. Then, rebinning grayscale pixel data associated with the decimated image and reassigning a selected range of grayscales representing a region of interest of the remapped grayscale pixel data to one while zeroing others. The method also includes labeling the connected pixels associated with the range of grayscales representing the region of interest and then extending the connected pixels through region growing using a preselected offset value. Lastly, the method includes filtering segmented regions of the connected pixels to eliminate certain candidates. The system is designed to implement the steps of the enumerated method.

9 Claims, 1 Drawing Sheet

GRAYSCALE IMAGE CONNECTED COMPONENTS SEGMENTATION

BACKGROUND OF THE INVENTION

1. Field of the Invention

The present invention generally relates to grayscale binning and, more particularly, to a method of grayscale image segmentation used for low contrast or busy image pattern recognition.

2. Background Description

Traditional binary image segmentation methods do not work on complex grayscale images with low contrast. An example of this problem is observed in applying segmentation techniques to postal bundle markers, pre-sort labels and other non-address postal glyphs, or address labels.

Being more specific, the small bundle markers (pre-sort labels) have a colored background which typically do not have enough contrast against a parcel background to allow effective binarization. The limited contrast between the pattern and the background results in critical information loss in the form of partial bundle mark pattern after a binarization algorithm is applied. In turn, this critical information loss may result in the mail having to be manually read and hence pre-sorted thereby resulting in added expense and time.

In order to segment and locate bundle marks on postal applications, it is thus necessary to use grayscale or color image in the segmentation process. The techniques applied to grayscale segmentation traditionally include region growing or split or merge or watershed methods. Additional segmentation methods may include boundary or edge detection, level-sets, as well as multi-resolution techniques such as, for example, wavelet, Gabor or Steerable filter, or threshold methods aimed at binary images. However, due to timing constraints and lack of contrast on "busy" magazine or parcel images, these techniques are not effective in locating the search targets within the timing budget.

The ability to identify the pre-sort label on a parcel representing different mail classes is necessary for parcel programs. On certain packages, the white address label in different sizes and shapes has relatively low contrast against a light brown package, for example. Due to this low contrast, it is very difficult to locate the pre-sort label or the white address label on the noisy binary image derived using the traditional threshold methods. It is also difficult to locate Royal mail glyphs in threshold binarized image. It is for these and other reasons that to locate the pre-sorting of mail with low contrast labels is difficult, time consuming and relatively inaccurate.

SUMMARY OF THE INVENTION

The present invention is directed to a method of reading images. The method includes decimating an image and normalizing the decimated image. Then, rebinning grayscale pixel data associated with the decimated image and reassigning a selected range of gray scales representing a region of interest to one while zeroing other range of gray scales. The method also includes labeling the connected pixels associated with the region of interest and then extending the connected pixels through region growing using a preselected offset value. Lastly, the method includes filtering segmented regions of interest to eliminate bad candidates.

The present invention further includes a system which implements the steps of the method described herein. Additionally, the steps of the present invention may also be implemented on a machine readable medium containing code.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
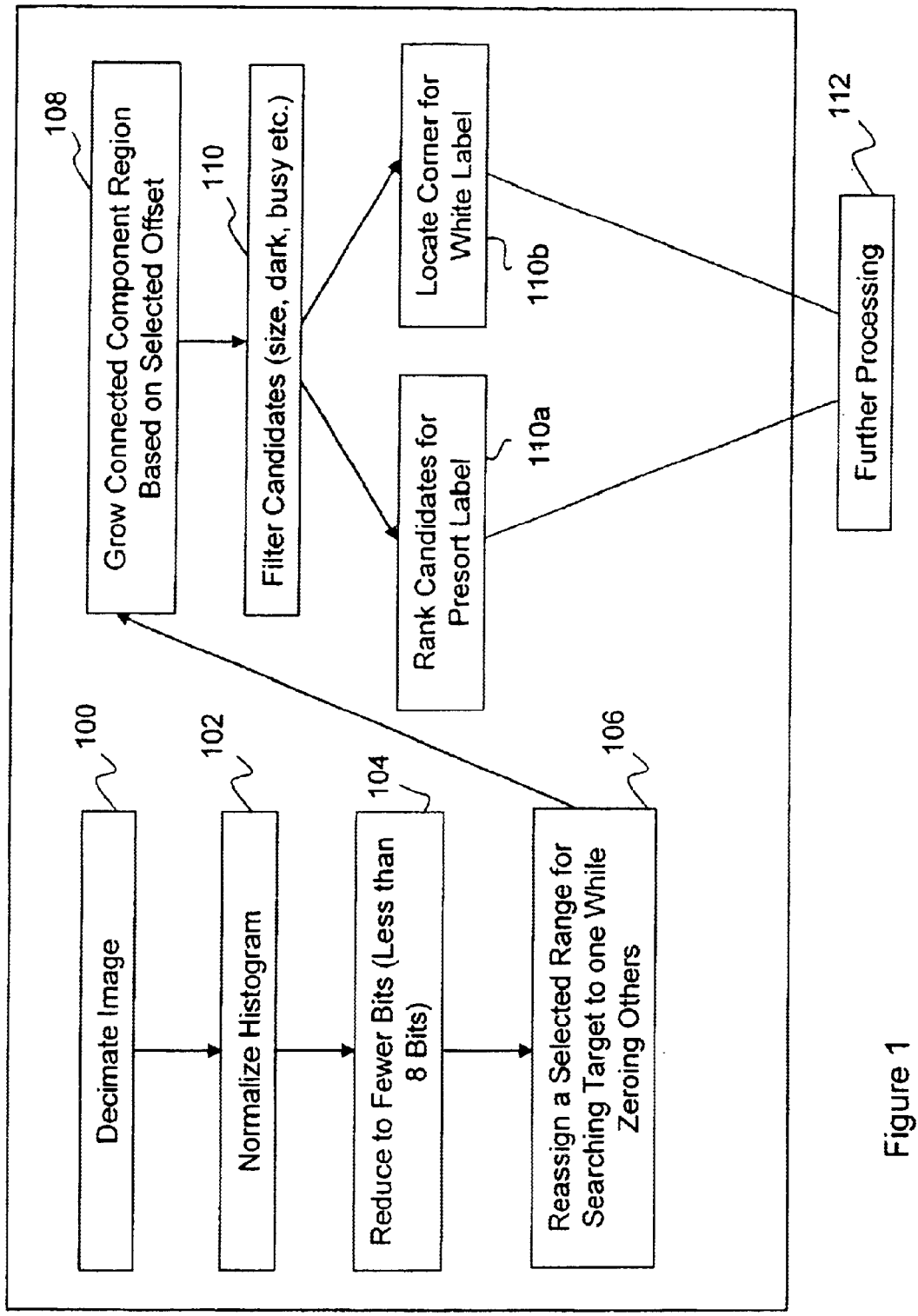
FIG. 1 is a flow diagram showing the steps implementing the method of the present invention.

The present invention is directed to a method of grayscale image segmentation used for pattern recognition of a low contrast image. By exploring the concept of gray level connected components, the grayscale segmentation technique of the present invention is very effective in locating the search target within a timing budget. The segmentation technique of the present invention generates very tightly cropped images, which is critical for pattern recognition by a classifier.

Referring now to the drawings and specifically FIG. 1, there is shown a flow diagram depicting the steps of the present invention. The flow diagram of FIG. 1 may be implemented by computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. It should further be recognized by those of ordinary skill in the art that the flow diagram of FIG. 1 may equally represent a high level block diagram of the present invention.

Now referring more specifically to FIG. 1, step 100 shows decimating a parcel image to minimize the processing time. This is performed due to the large parcel images occupying a few megabytes. It should be recognized that the present invention may also be implemented to read other images. In decimating the parcel image, in embodiments, the present invention reduces the number of pixels for calculating purposes. In step 102, the decimated image histogram is normalized. After filtering out insignificant signals, the minimum and maximum from the image histogram is selected. That is, in normalizing the image, the minimum and maximum of the intensity of the image is adjusted to span the entire scale, ranging in value of 1 to 256. When an image has been found to have a minimum and maximum range between 150 and 256, for example, the value of 150 will be stretched to the value 1. This will ensure that the image is neither too dark or too light, and that it will contain a range comparable to other images.

The grayscale pixel data of the decimated image is then remapped from 8 bits to fewer bits, in step 104. Typically, 3 bits is used to speed up processing. In step 106, the range of grayscale representing the region of interest of the remapped data is selected and reassigned to one while zeroing others, for example, select values between 5 and 7 for white address label findings after rebinning to 3 bits. In step 108, the connected pixels are labeled and extended to form regions using a preselected offset value. That is, even if there is a break in a line of less than 4 or 5 pixels apart, the present invention will consider that the pixels in a line are connected with no break. The preselected offset value typically will not exceed 4 or 5 values. Finally, in step 110, all the segmented regions of interest are filtered to eliminate bad candidates. The filtering may include ranking the candidates for pre-sort labels, in step 110a, or locating corners for white labels, in step 110b. In step 112, the image information is then sent for further processing such as, for example, optical character recognition.

In experimentations, it was found that by using the method of the present invention, a high percentage of correctly segmented pre-sort labels fed to a classifier produces a high pattern recognition rate in the pre-sorted label case. In the white address label case, a high percentage of correctly segmented address labels with four corners further identified enables the continuation of character segmentation and address recognition.

Accordingly, the grayscale segmentation technique of the present invention is very effective in locating the search targets within the timing budget. The grayscale connected component concept produces tightly cropped images, which further aids pattern recognition by a classifier. This technique can be applied to any target searching application.

While the invention has been described in terms of preferred embodiments, those skilled in the art will recognize that the invention can be practiced with modification within the spirit and scope of the appended claims.

Having thus described our invention, what we claim as new and desire to secure by letters Patent is as follows:

1. A method of reading images, comprising the steps of:
   decimating an image;
   normalizing the decimated image histogram;
   rebinning grayscale pixel data associated with the decimated image;
   reassigning a selected range of gray scales representing a region of interest of the remapped grayscale pixel data to one while zeroing others;
   labeling the connected pixels associated with the range of gray scales representing the region of interest;
   joining and extending the connected pixels through region growing using a pre-selected offset value; and
   filtering segmented regions of the connected pixels to eliminate certain candidates.

2. The method of claim 1, wherein the grayscale pixel data of the decimated image is remapped from 8 bits to fewer than 8 bits.

3. The method of claim 1, wherein the image is a parcel image.

4. The method of claim 3, wherein the parcel image has a low contrast compared to a background.

5. The method of claim 1, wherein the filtering step includes ranking candidates for pre-sort labels or locating corners of the candidates for white labels.

6. A system for reading images, comprising:
   means for decimating an image;
   means for normalizing the decimated image histogram;
   means for rebinning grayscale pixel data associated with the decimated image;
   means for reassigning a selected range of grayscales representing a region of interest of the remapped grayscale pixel data to one while zeroing others;
   means for labeling the connected pixels associated with the range of grayscales representing the region of interest;
   means for joining and extending the connected pixels through region growing using a pre-selected offset value; and
   means for filtering segmented regions of the connected pixels to eliminate certain candidates.

7. The system of claim 6, wherein the grayscale pixel data of the decimated image is remapped from 8 bits to fewer than 8 bits.

8. The system of claim 6, the means for filtering includes means for ranking candidates for pre-sort labels or locating corners of the candidates for white labels.

9. A machine readable medium containing code for reading images, comprising the steps of:
   decimating an image;
   normalizing the decimated image histogram;
   rebinning grayscale pixel data associated with the decimated image;
   reassigning a selected range of grayscales representing a region of interest of the remapped grayscale pixel data to one while zeroing others;
   labeling the connected pixels associated with the range of grayscales representing the region of interest;
   joining and extending the connected pixels through region growing using a pre-selected offset value; and
   filtering segmented regions of the connected pixels to eliminate certain candidates.

* * * * *